United States Patent
Hua et al.

[11] Patent Number: 6,031,488
[45] Date of Patent: Feb. 29, 2000

[54] METHOD AND SYSTEM FOR AN EFFICIENT LOW COST PPS GPS RECEIVER

[75] Inventors: Quyen Dan Hua, Fremont; Valentine L. Denninger, Sunnyvale, both of Calif.

[73] Assignee: Trimble Navigation Limited, Sunnyvale, Calif.

[21] Appl. No.: 09/287,547

[22] Filed: Apr. 6, 1999

[51] Int. Cl.[7] .............................. G01S 5/02; H04B 7/185
[52] U.S. Cl. ............................ 342/357.12; 342/357.06; 701/213
[58] Field of Search ................... 342/357.01, 357.06, 342/357.12; 701/213; 380/25, 47

[56] References Cited

U.S. PATENT DOCUMENTS

| | | | |
|---|---|---|---|
| 5,757,916 | 5/1998 | MacDoran et al. | 380/25 |
| 5,786,790 | 7/1998 | Abbott | 342/357 |
| 5,903,654 | 5/1999 | Milton et al. | 380/49 |

*Primary Examiner*—Thomas H. Tarcza
*Assistant Examiner*—Dao L. Phan
*Attorney, Agent, or Firm*—Wagner, Murabito & Hao LLP

[57] ABSTRACT

A system for processing a PPS (precise positioning service) signal from a GPS (global positioning system) satellite to obtain PPS based positioning information therefrom. A first GPS receiver is adapted to process a PPS signal from a GPS satellite. The first GPS receiver is further adapted to output CVas (Crypto Variable Anti Spoofing) and SA correction information corresponding to the PPS signal. A second GPS receiver is adapted to receive the CVas and SA correction information from the first GPS receiver. The second GPS receiver is further adapted to process the PPS signal using the SA correction information received from the first GPS receiver and generate PPS based positioning information therefrom. The second GPS receiver does not include a KDP(key data processor). Accordingly, the second GPS receiver is not as tightly controlled as the first GPS receiver.

20 Claims, 6 Drawing Sheets

METHOD AND SYSTEM FOR AN EFFICIENT LOW COST PPS GPS RECEIVER

TECHNICAL FIELD

The present invention relates generally to positioning and navigation systems. More specifically, the present invention pertains to a system for implementing a cost efficient precise positioning service global positioning receiver.

BACKGROUND ART

The aviation industry relies upon numerous navigation aids in order safely to take off, navigate enroute, and land aircraft. Such navigation aids (naviads) include, for example, the instrument landing system (ILS), very high frequency omni-directional range (VOR) system, and the like. The Navstar Global Positioning System, hereafter referred to simply as GPS, is increasingly being accepted as an alternative to traditional navigation aids. In addition to civilian applications, GPS is being used extensively by the United States Department of Defense (DOD) to provide military users with highly accurate position, velocity, and time information for weapons systems.

GPS is a space based radio positioning network for providing users equipped with suitable receivers highly accurate position, velocity, and time (PVT) information. Developed by the United States Department of Defense (DOD), the space based portion of GPS comprises a constellation of GPS satellites in non-geosynchronous 12 hour orbits around the earth.

Figure 1:
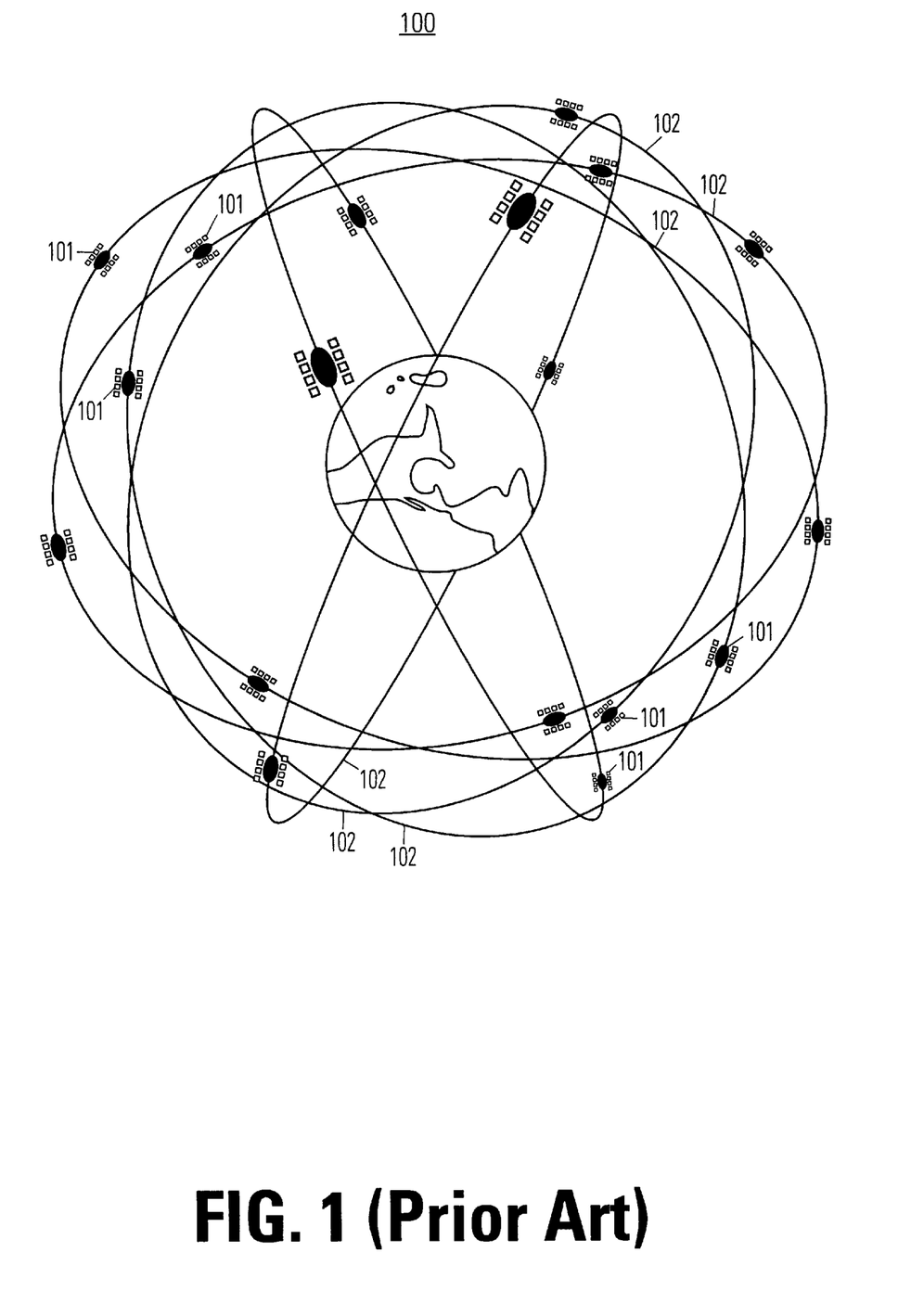
FIG. 1 shows a constellation of GPS satellites in orbit.

Prior art FIG. 1 shows the constellation 100 of GPS satellites 101 in orbit. The GPS satellites 101 are located in six orbital planes 102 with four of the GPS satellites 101 in each plane, plus a number of "on orbit" spare satellites (not shown) for redundancy. The orbital planes 102 of the GPS satellites 101 have an inclination of 55 degrees relative to the equator and an altitude of approximately 20,200 km (10,900 miles) and typically complete an orbit in approximately 12 hours. The positions of GPS satellites 101 are such that a minimum of five of the GPS satellites 101 are normally observable (above the horizon) by a user anywhere on earth at any given time.

GPS position determination is based upon a concept referred to as time of arrival (TOA) ranging. Each of the orbiting GPS satellites 101 broadcasts spread spectrum microwave signals encoded with positioning data and satellite ephemeris information. The signals are broadcast on two frequencies, L1 at 1575.42 MHz and L2 at 1227.60 MHz, modulated using bi-phase shift keying techniques. Essentially, the signals are broadcast at precisely known times and at precisely known intervals. The signals are encoded with their precise time of transmission. A user receives the signals with a GPS receiver designed to time the signals and to demodulate the satellite orbital data contained in the signals. Using the orbital data, the GPS receiver determines the time between transmission of the signal by the satellite and reception by the receiver. Multiplying this by the speed of light gives what is termed the pseudo range measurement of that satellite. If the GPS receiver clock were perfect, this would be the range measurement for that satellite, but the imperfection of the clock causes it to differ by the time offset between actual time and receiver time. Thus, the measurement is called a pseudo range, rather than a range. However, the time offset is common to the pseudo range measurements of all the satellites. By determining the pseudo ranges of four or more satellites, the GPS receiver is able to determine its location in three dimensions, as well the time offset. Thus, a user equipped with a proper GPS receiver is able to determine his PVT with great accuracy, and use this information to navigate safely and accurately from point to point, among other uses.

In addition to the well known civilian applications discussed above, GPS is being used extensively by the DOD (e.g., Air Force, navy, army, etc.). The increased accuracy of GPS based navigation and position determination enables the more efficient utilization of military assets. For example, GPS based PVT enable the more coordinated maneuvering of platforms (e.g., ships, aircraft, land vehicles, etc.), more accurate assessment of opposing force deployments, the more accurate delivery of unguided, or "dumb" weapons, and the accurate guidance and targeting of precision guided "smart" weapons.

One of the most rapidly increasing military applications of GPS is the employment of GPS receivers directly into precision guided weapon (e.g., an air-dropped precision guided bomb), thereby increasing its accuracy. Such GPS receivers are referred to as disposable since they are expended as their incorporating munitions are expended. The cost effective and efficient incorporation of disposable GPS receivers directly into precision guided munitions (PGMs) is keen area of interest for the DOD.

DOD GPS applications require the most accurate PVT possible. These applications also need to be secure from jamming spoofing and other types of countermeasures. Thus the disposable GPS receivers are designed to utilize the encoded PPS (precise, or protected positioning service).

As is well known, PPS is a high accuracy (e.g., published specifications to 6 meters 1DRMS horizontal, or 16 meters CEP) service used by DOD authorized users (e.g., the military). PPS is based upon processing P code signals modulated on both the L1 frequency and the L2 frequency. When encrypted, as in times of war, the P code becomes the Y code, necessitating the use of special crypto keys available only to DOD authorized users using specialized GPS receiver equipment.

Figure 2:
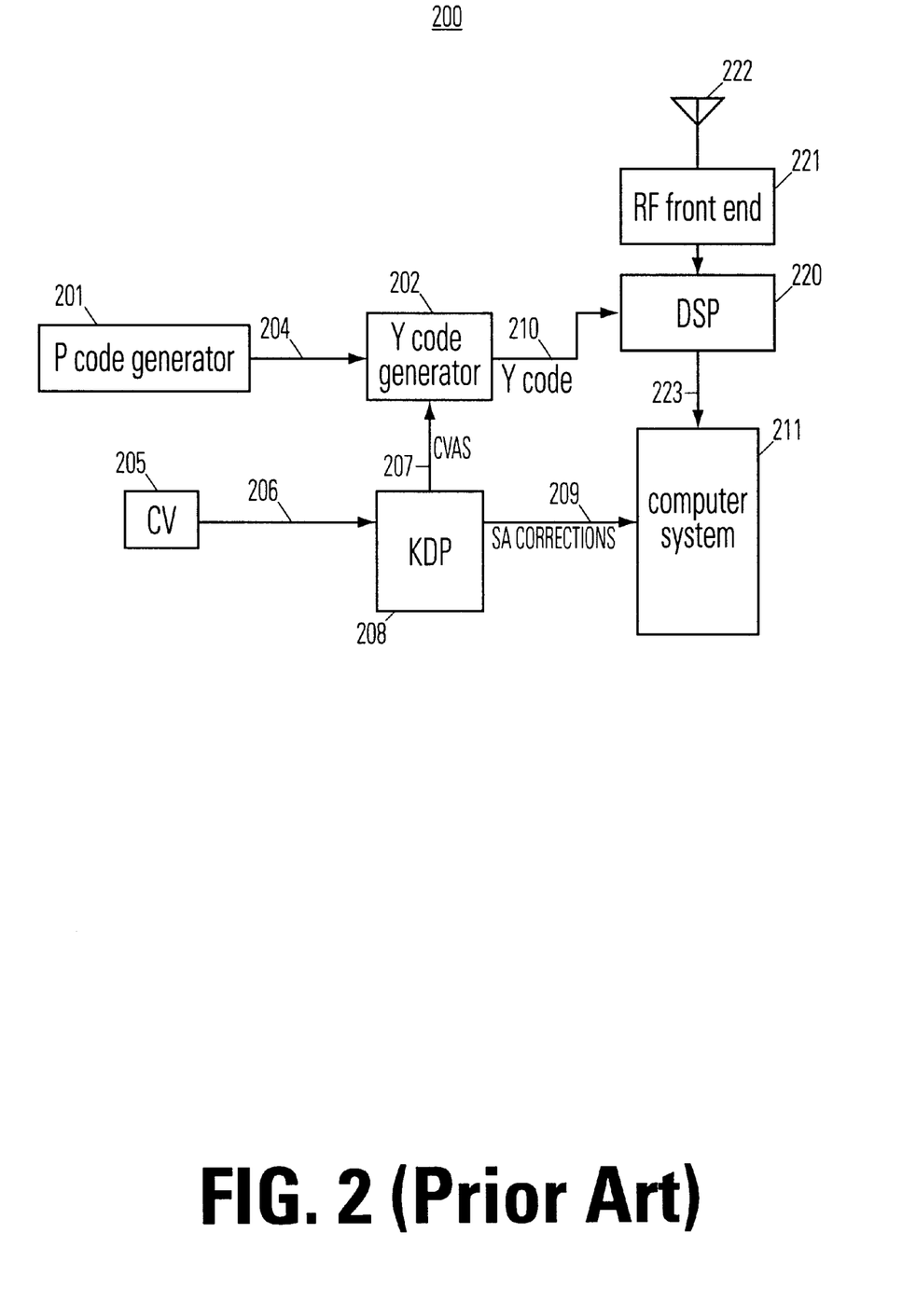
FIG. 2 shows a prior art PPS system.

Prior Art FIG. 2 shows a typical prior art PPS receiver system 200. System 200 shows the specialized encryption receiver components utilized in generating the encoded Y code signal. As is well known in the art, a replica of the Y code signal must be generated by a GPS receiver in order to achieve a lock on the Y code signal transmitted from the respective GPS satellites. System 200 depicts the components required to generate the Y code signal replica.

As shown in FIG. 2, system 200 includes a P code generator 201 coupled to a Y code generator 202 via line 204. Y code generator 202 is coupled to a KDP 208 (key data processor) via line 207. KDP 208 is also coupled to a CV 205 (crypto-variable) keying device and a computer system 211 via line 206 and line 209.

System 200 functions by generating a Y code replica for use by an incorporating GPS receiver in locking onto a transmitted Y code signal from a GPS satellite. As is well known, a Y code is generated by properly encrypting the P code. P code generator 201 generates a replica P code and couples this P code to Y code generator 202 via line 204. Y code generator 202 encrypts this P code using a CVas (crypto variable anti spoof) key received from KDP 208 via line 207. Y code generator 202 generates the Y code 210 by encrypting the P code using the CVas key provided by KDP 208. The Y code 210 is coupled to a DSP 220 where it is used to process Y code signals received from the GPS satellites via antenna 222 and RF front end 221. The resulting positioning information is subsequently coupled to the computer system 211 via line 223. KDP 208 also couples SA corrections to computer system 211 via line 209 which allows the computer system 211 to cancel out the PVT errors due to selective availability (SA).

The KDP 208 functions by generating the CVas key used by Y code generator 202. As is known by those skilled in the art, KDP 208 generates the CVas by using a CV (cryptovariable) key 205. The KDP 208 thus generates the CVas key from the CV key 205. Thus, system 200 enables the incorporating GPS receiver to decode and process the encrypted Y code signals from the GPS constellation.

Only users equipped with GPS receivers which incorporate Y code hardware (e.g., KDP 208, and Y code generator 202) and which have current CV keys are able to process the Y code signals. Consequently, access to the CV keys are very tightly controlled. In addition, the design of the encrypting hardware of KDPs (e.g., KDP 208) is very tightly controlled. This high level of control greatly increases the cost of fielding and maintaining an inventory of PPS receivers.

In addition, current KDPs are typically implemented as chip sets of three or more discreet integrated circuits. Accordingly, the KDP accounts for a significant portion of the cost of the PPS receiver. The multi chip KDP implementation also increases the complexity of a PPS receiver, its ability to be tested, and the like. These are all disadvantages when the objective is to use highly accurate and cost effective PPS receivers in the military, especially in the case of disposable PPS receivers for use with PGMs.

Thus, what is required is a system which provides a more cost effective PPS receiver than the prior art. What is required is a system which eliminates the disadvantages of the prior art KDPs. What is required is a system which is well suited to employment in disposable receivers. What is further required is a system which provides these advantages without compromising accuracy, integrity, or security. The present invention provides a novel solution to the above requirements.

DISCLOSURE OF THE INVENTION

The present invention provides a PPS GPS system which is more cost effective and more efficient than prior art PPS receivers. The system of the present invention eliminates the disadvantages associated with prior art KDPs. Accordingly, the system of the present invention is well suited to employment where a disposable receiver is required. In addition, the system of the present invention provides these advantages without compromising accuracy, integrity, or security.

The present invention is implemented as a cost effective and efficient PPS system for generating a Y code replica for processing an encrypted Y code signal from a GPS satellite. The present invention uses one receiver to generate a CVas and then distributes this CVas to other, less complex receivers. In so doing, both the one receiver and the other less complex receivers are able to process encrypted Y code signals from the GPS satellites.

In one embodiment, a first GPS receiver equipped with a KDP is used to generate a CVas. The first GPS receiver includes a Y code generator adapted to generate a Y code using the CVas from the KDP and a P code from an internal P code generator. The Y code is used to lock onto a Y code signal from a GPS satellite and provide PPS based PVT. The CVas generated by this first GPS receiver is made externally available to other less complex GPS receivers that are not equipped with KDPs. These receivers utilize the externally derived CVas and an internally generated P code to generate a valid Y code. This Y code allows the less complex GPS receivers to lock onto a Y code signal from a GPS satellite and provide PPS based PVT. Thus, even though they provide the same PPS based PVT as the first, KDP equipped, GPS receiver, the less complex GPS receivers are less expensive to fabricate, and are thus, more suited to use as disposable GPS receivers.

In this manner, a low-cost PPS system in accordance with the present invention provides the required Y code without using a built in KDP or needing a CV code key. Valid sequences of CVas for all satellites being tracked are generated by an external device (e.g., an external KDP equipped GPS receiver) and subsequently provided to the PPS system. Once the PPS system obtains the valid CVas sequence for all satellites, it functions nominally, providing an accurate Y code replica to the GPS receiver. By not including a KDP and by not storing CV data internally, the PPS equipped GPS receiver of the present invention is less expensive than prior art PPS systems. In addition, by not including a KDP and by not storing CV data internally, the classification level of the PPS system is much lower than a comparable prior art PPS receiver. This greatly reduces the costs of stockpiling and maintaining large numbers of PPS systems, as in the case of maintaining large stock piles of PPS equipped PGMs.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DETAILED DESCRIPTION OF THE INVENTION

Reference will now be made in detail to the preferred embodiments of the invention, an inexpensive monitoring technique for achieving high level integrity monitoring for GPS, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "translating" or "processing" or "decrypting" or "encrypting" or "decoding" or "encoding" or "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a PPS GPS system which is more cost effective and more efficient than prior art PPS receivers. The system of the present invention eliminates the disadvantages associated with prior art KDPs. Accordingly, the system of the present invention is well suited to employment where a disposable receiver is required. In addition, the system of the present invention provides these advantages without compromising accuracy, integrity, or security. These and other advantages of the present invention are further described below.

Figure 3:
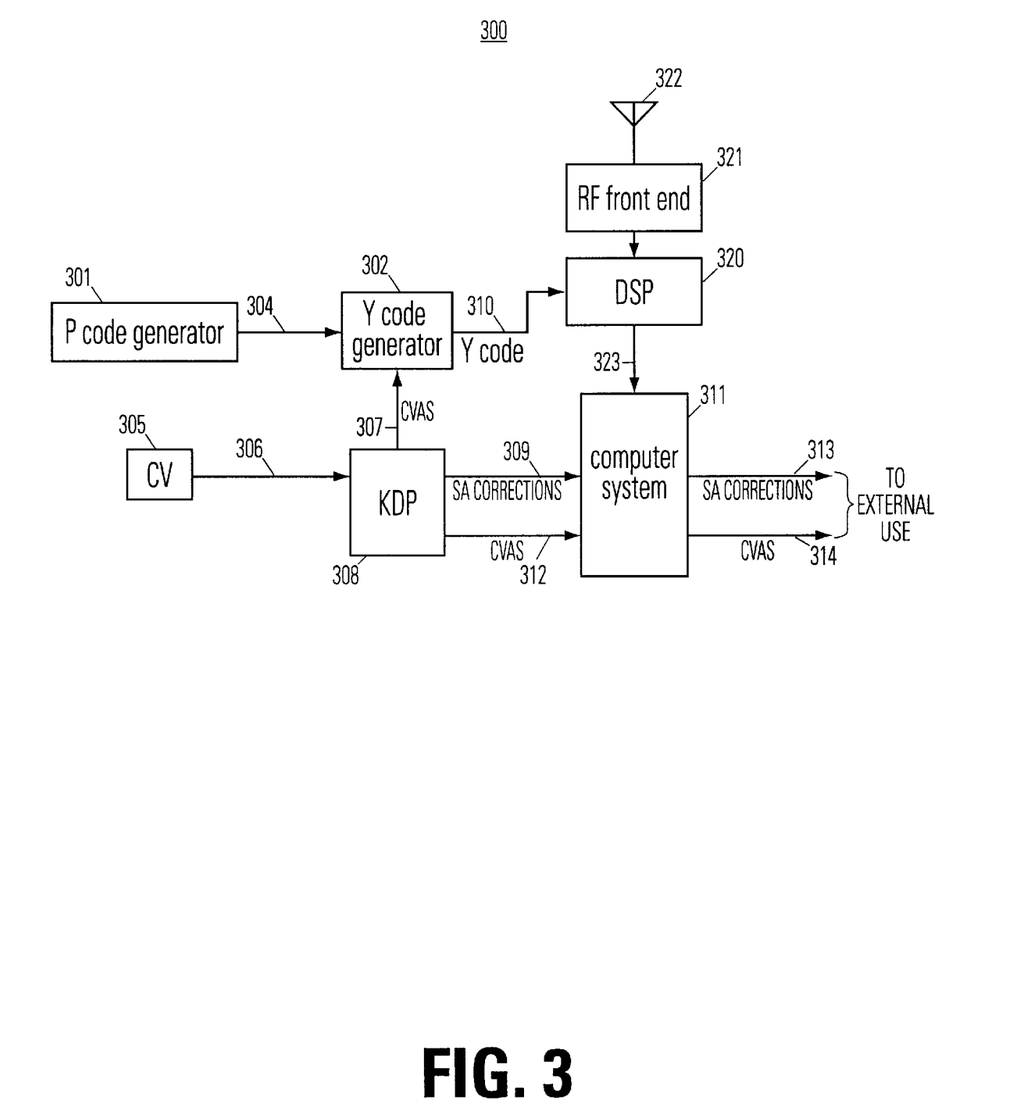
FIG. 3 shows a mother receiver PPS system in accordance with one embodiment of the present invention.

Referring now to FIG. 3, a "mother receiver" PPS system 300 in accordance with one embodiment of the present invention is shown. System 300 shows the specialized encryption-decryption components utilized in decrypting an encoded GPS Y code signal. PPS system 300 includes a KDP 308 and is used to generate and provide both SA correction information and CVas information to external "daughter receivers" (e.g., daughter receiver PPS system 400 of FIG. 4) that do not include KDP hardware.

As shown in FIG. 3, system 300 includes a P code generator 301 coupled to a Y code generator 302 via line 304. Y code generator 302 is coupled to a KDP 308 via line 307. KDP 308 is also coupled to a CV 305 (crypto-variable) keying device and a computer system 311 via line 306 and line 309.

System 300 functions by generating a Y code replica for use by an incorporating GPS receiver in locking onto a transmitted Y code signal from a GPS satellite. The Y code is generated by encrypting the P code (received from P code generator 301 via line 304) using Y code generator 302. Y code generator 302 encrypts this P code using a CVas key received from KDP 308 via line 307. The KDP 308 generates CVas keys by using a CV key 305. Y code generator 302 generates the Y code 310 by encrypting the P code using the CVas keys provided by KDP 308. The Y code 310 is coupled to a DSP 320 where it is used to process Y code signals received from the GPS satellites via antenna 322 and RF front end 321. The resulting positioning information is subsequently coupled to the computer system 311 via line 323, thereby allowing computer system 311 to generate PPS based PVT. KDP 308 couples SA correction information to computer system 311 via line 309, allowing the computer system 211 to cancel out the PVT errors due to selective availability (SA).

KDP 308 uses the CV to decode SA correction data included in the C/A code signal received from each GPS satellite. As is well known, the C/A code signal from each GPS satellite contains various data describing the health, status, ephemeris, and other information about that respective satellite. In addition to the above information, the C/A code also contains data describing the SA corrections of both the Y code and the C/A code. Users having a valid CV are thus able to obtain the SA corrections and use them to cancel the effects of SA. All other users (e.g., civilian users) must use other means to correct SA (e.g., differential GPS, etc.).

In addition to the SA correction information, KDP 308 also couples the CVas to computer system 311. This SA correction and CVas information is subsequently made available to one or more external daughter PPS systems via line 313 and line 314.

Figure 4:
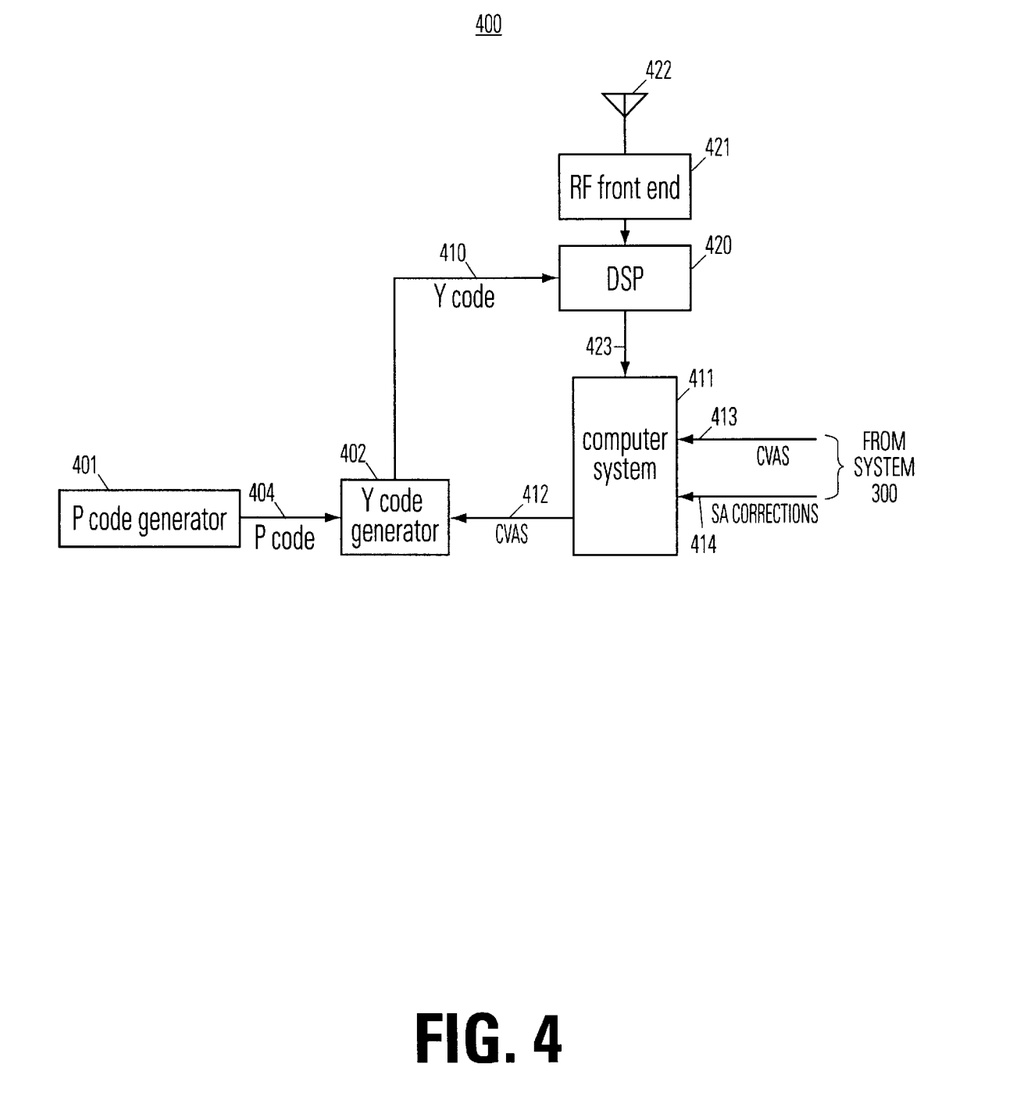
FIG. 4 shows a daughter receiver PPS system in accordance with one embodiment of the present invention.

FIG. 4 shows a daughter receiver PPS system 400 in accordance with one embodiment of present invention. In accordance with the present invention, system 400 eliminates the requirement for a KDP (e.g., KDP 208 of FIG. 2). Unlike prior art PPS systems (e.g., system 200) system 400 of the present invention generates a Y code replica using a CVas from an external mother receiver (e.g., system 300). This CVas is used to encrypt the P code from P code generator 401. By not including a KDP, system 400 eliminates the three or more discreet chips which comprise the KDP, along with their inherent disadvantages (e.g., size, cost, added complexity, etc.). In addition, by not including a KDP, system 400 of the present invention is not as highly controlled as prior art PPS systems, and thus, is significantly less expensive to stockpile and maintain over its life cycle.

System 400 eliminates the prior art KDP by obtaining the CVas sequence from an external mother receiver. The CVas sequence is received via line 413 and SA corrections are received via line 411. Computer system 411 uses the SA corrections to cancel the effects of selective availability. Computer system 411 passes the externally received CVas to Y code generator 402 via line 412.

Accordingly, once Y code generator 402 obtains the CVas from computer system 411, the Y code is generated (using the P code received from P code generator 401 via line 404) and coupled to DSP 420 via line 410. As with system 300, DSP 420 processes Y code signals received from the GPS satellites via RF front end 421 and antenna 422 and couples the resulting positioning information to computer system 411 via line 423.

As is well known, a valid CVas is required to encrypt the P code and thereby obtain a Y code. However, instead of generating the CVas locally with a CV key and a KDP, as in the prior art, system 400 of the present invention uses an external device (the mother receiver, system 300) equipped with its respective KDP and CV key to generate a CVas sequence. This CVas sequence is subsequently coupled to system 400 (in this example, via line 417 and computer system 412). Once in possession of a valid CVas sequence, system 400 functions nominally, with the same accuracy and integrity of a prior art KDP equipped PPS system.

The CVas can be provided to system 400 by any of a number of possible means. Such means include, for example, RF links, digital bus links (e.g., 1553), and the like. Thus, one external KDP and CV equipped PPS system (e.g., a mother receiver) can provide a valid CVas for a very large number of less complex PPS systems (e.g., daughter receivers) via, for example, a wireless RF link. After the daughter receiver systems receive the valid CVas and SA correction information, they are each able to generate the necessary Y codes for determining PPS based PVT for each of their respective platforms. Hence, in accordance with the present invention, one more expensive KDP equipped platform is able support a large number of disposable "KDP less" PPS systems.

This provides a great advantage in certain military applications. For example, in the case of weapons platforms that carry large numbers of PGMs, the use of PPS systems in accordance with the present invention increases efficiency and decreases costs. In a typical application, a large number of daughter receiver equipped PGMs stored in the weapons bay of a military rocket launcher (e.g., the US Army's MLRS system) are provided with a valid CVas prior to weapons release, thereby enabling accurate PPS based guidance. The daughter receiver type PPS guidance systems incorporated by the PGMs facilitate less expensive stockpiling since they are not as tightly controlled as prior art PPS systems. In addition, more daughter receiver type PPS equipped PGMs can be procured for a given amount of money since the PPS units themselves are less expensive than the prior art. The operation of system 400 is further described below.

Referring still to FIG. 4, as is well known, the Y code replica generated by Y code generator 402 and coupled to DSP 420 via line 410 is used by DSP 420 to lock onto the Y code signals transmitted from the GPS satellites. Essentially, the Y code replica is loaded into correlation registers of a signal correlator the GPS receiver. The signal correlator functions by aligning the Y code replica with the Y code signal transmitted from a GPS satellite to correlate and extract the extremely low power Y code signal from the background noise. Thus, it should be appreciated that the system of the present invention still requires access to a valid CVas in order to function.

An important benefit provided by system 400 is that there is no key stored with or loaded in the system 400 when stockpiled. Unlike prior art systems, when not in use, there is no CV key stored in any of the components of system 400. This reduces the classification level of system 400 and thus the severity of the storage requirements. Accordingly, military users are thus able to store large numbers of PPS systems of the present invention far more cost effectively.

It should also be appreciated that the time period between receiving the CVas from the external device and the employment of the weapon is preferably relatively short. This is due to the fact that while P codes change week by week, the period for the CVas changes much more frequently. Hence, the longer the duration of the period of time between reception of the CVas and employment of the weapon, the more CVas data the PPS system of the present invention needs to store. This is not desirable since the more highly classified CVas data stored in the PPS system, the more of a security risk the system becomes.

Figure 5:
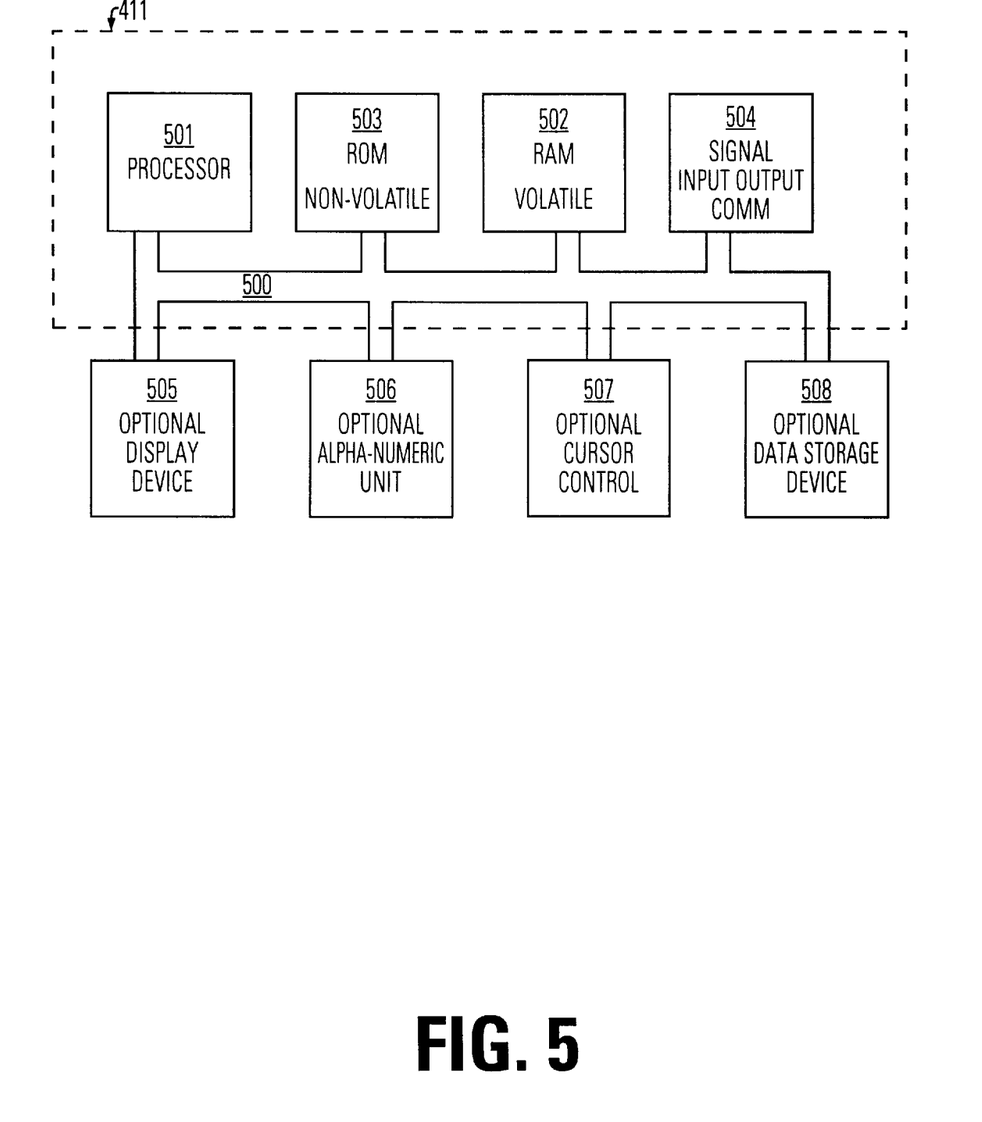
FIG. 5 shows a computer system in accordance with one embodiment of the present invention.

Referring now to FIG. 5, a diagram of computer system 411 in accordance with one embodiment of the present invention is shown in greater detail. Within the discussions herein, it should be noted that certain processes and steps are discussed that are realized, in one embodiment, as a series of instructions (e.g., software program) that reside within computer readable memory units of system 411 and executed by processor 501 of system 411. When executed, the instructions cause the computer system 411 to perform specific functions and exhibit specific behavior as described.

In general, computer system 411 used by the present invention comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 411 also includes a mass storage computer readable data storage device 504 such as a magnetic or optical disk and disk drive coupled with the bus 500 for storing information and instructions. Optionally, system 411 can include a display device 505 coupled to the bus 500 for displaying information to the computer user (e.g., maintenance technician, etc.), an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

Figure 6:
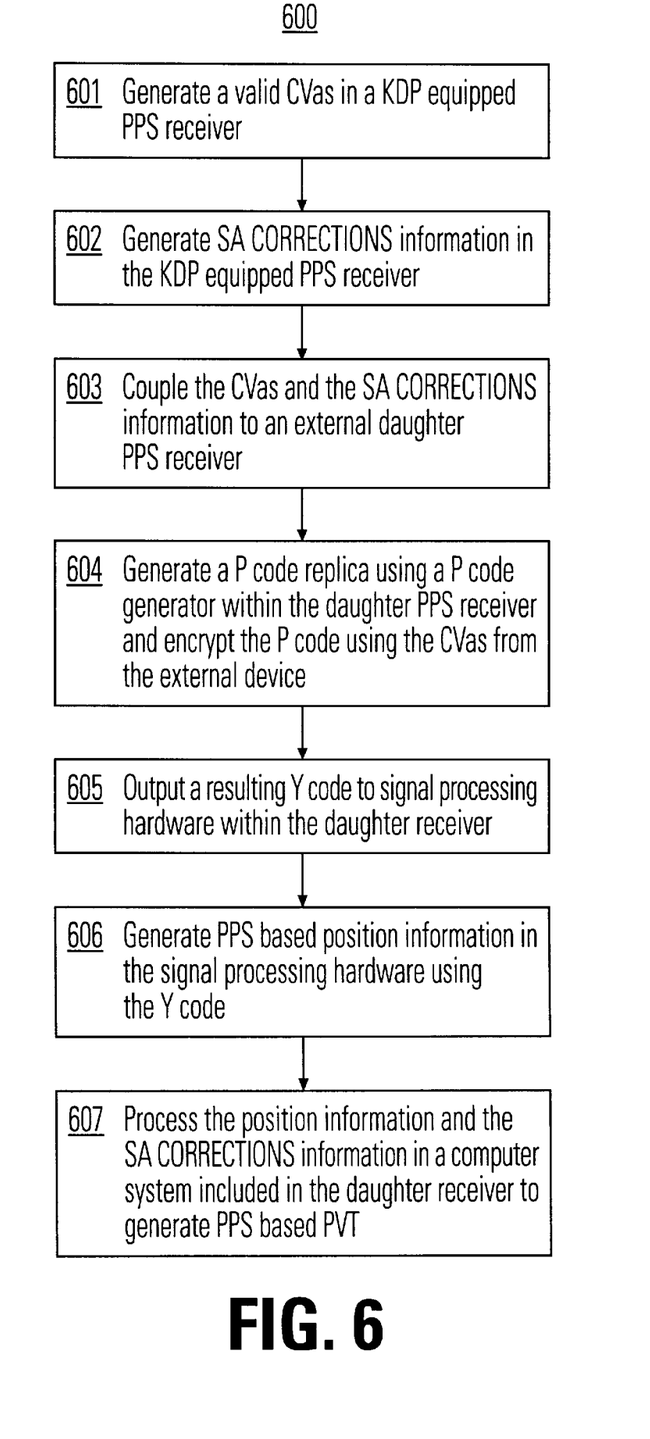
FIG. 6 shows a flow chart of the steps of an operating process of a PPS system in accordance with one embodiment of the present invention.

With reference now to FIG. 6, a flow chart of the steps of a process 600 in accordance with one embodiment of the present invention is shown. Process 600 depicts the operating process of a PPS system in accordance with one embodiment of the present invention (e.g., the operation of PPS system 300 of FIG. 3 with PPS system 400 of FIG. 4). Specifically, process 600 depicts the steps involved in generating valid CVas and SA correction information in a mother type PPS receiver (equipped with a KDP) and generating PPS based PVT in a daughter type PPS receiver therefrom.

Process 600 begins in step 601, where a valid CVas is generated in an mother receiver type PPS system (e.g., system 300 of FIG. 3). As described above, the CVas is generated by a KDP using a valid CV. The KDP and the CV hardware are included in the mother receiver.

In step 602, the KDP in the mother GPS receiver generates SA correction information. As described above, this SA correction information is used to cancel out the effects of SA.

In step 603, the CVas and the SA correction information is coupled to one or more external daughter type PPS receivers. As described above, this information can be made available to the daughter receivers via several means (e.g., wireless, etc.).

In step 604, the daughter receiver generates a P code replica using a P code generator (e.g., P code generator 301). The P code is coupled to a Y code generator (e.g., Y code generator 302) where it is encrypted by Y code generator 302 using the CVas received from the external mother receiver. The encryption process yields a Y code.

In step 605, the resulting Y code is output from Y code generator 302 to signal processing hardware (e.g., DSP 420) included within the receiver.

In step 606, system 400 uses the Y code to generate PPS based position information. As described above, the Y code replica is used the DSP 420 to lock onto the Y code signal transmitted from the GPS satellite. Using the Y code, DSP 420 extracts the Y code signal and computes Y code based positioning information (e.g., pseudo ranges, etc.) therefrom. The positioning information is subsequently output to a computer system included within the daughter receiver (e.g., computer system 411).

In step 607, the positioning and SA correction information are processed by computer system 411 to generate PPS based PVT. Computer system 411 uses the SA correction information to cancel out the SA errors from the positioning information. Thus, the daughter receiver provides accurate reliable PPS based PVT without the disadvantages of including KDP or CV hardware.

Thus, the present invention provides a PPS GPS system which is more cost effective and more efficient than prior art PPS receivers. The system of the present invention eliminates the disadvantages associated with prior art KDPs. The present invention is well suited to employment where a disposable receiver is required. In addition, the system of the present invention provides these advantages without compromising accuracy, integrity, or security.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A system for processing a PPS (precise positioning service) signal from a GPS (global positioning system) satellite to obtain PPS based positioning information therefrom, comprising:
   a first GPS receiver adapted to process a PPS signal from a GPS satellite, said first GPS receiver further adapted to output CVas (Crypto Variable Anti Spoofing) and SA correction information corresponding to said PPS signal; and
   a second GPS receiver adapted to receive said CVas and SA correction information from said first GPS receiver, said second GPS receiver further adapted to process said PPS signal using said SA correction information received from said first GPS receiver and generate PPS based positioning information therefrom.

2. The system of claim 1, wherein said first GPS receiver further includes a KDP (key data processor) adapted to receive a CV (crypto variable) from an external keying device, said KDP operable for generating said CVas and SA correction information.

3. The system of claim 1, wherein said second GPS receiver further includes:
   a computer system having a processor coupled to a memory via a bus, said computer system adapted to receive said CVas and SA correction information from said first GPS receiver; and
   a Y code generator coupled to receive said CVas from said computer system and generating a Y code therefrom.

4. The system of claim 3, wherein said Y code generator is coupled to receive a P code from a P code generator built into said second GPS receiver, said Y code generator adapted to encrypt said P code using said CVas code in order to generate said Y code.

5. The system of claim 4, wherein said second GPS receiver is adapted to process said PPS signal using said Y code to generate said PPS based positioning information.

6. The system of claim 3, wherein said computer system is configured to process said positioning information using said SA correction information to correct said positioning information for selective availability effects.

7. The system of claim 1, wherein said second GPS receiver does not include a KDP(key data processor).

8. The system of claim 7, wherein said first GPS receiver has a higher security classification level than said second GPS receiver.

9. A GPS receiver system for processing a PPS (precise positioning service) Y code signal from a GPS (global positioning system) satellite, comprising:
   a GPS receiver adapted to receive Y code signals from a GPS satellite;
   a P code generator adapted to generate a P code;
   a Y code generator, said Y code generator coupled to receive said P code from said P code generator;
   a computer system having a processor coupled to a memory via a bus; and
   said computer system adapted to receive a CVas (crypto variable anti spoof) code from an external device and couple said CVas code to said Y code generator, said Y code generator adapted to encrypt said P code using said CVas code in order to generate a Y code replica, said Y code generator further adapted to output said Y code replica to said GPS receiver to enable said GPS receiver to process said Y code signal from said GPS satellite and generate PPS based positioning information therefrom.

10. The system of claim 9, wherein said P code generator, said computer system, and said Y code generator are included within said GPS receiver and wherein said GPS receiver does not include a Key Data Processor.

11. The system of claim 9, wherein said external device is an external GPS receiver adapted to process PPS signals, said external GPS receiver including a Key Data Processor operable for generating said Cvas sequence.

12. The system of claim 9, wherein said computer system is adapted to store said CVas sequence for a period of time to enable the generation of said Y code replica over said period of time.

13. The system of claim 9, wherein said computer system is further adapted to receive SA correction information from said external device and correct said positioning information using said SA correction information.

14. The system of claim 9, wherein said CVas sequence is transmitted from said external device to said computer system via a wireless RF link.

15. The system of claim 9, wherein said Cvas sequence is transmitted from said external device to said computer system via a bus link.

16. A method for processing a PPS (precise positioning service) signal from a GPS (global positioning system) satellite to obtain PPS based positioning information therefrom, the method comprising the steps of:
   a) processing a PPS signal from a GPS satellite using a first GPS receiver;
   b) outputting CVas (Crypto Variable Anti Spoofing) and SA correction information corresponding to said PPS signal from said first GPS receiver;

c) receiving said CVas and SA correction information with a second GPS receiver;

d) receiving said PPS signal using said second GPS receiver; and e) processing said PPS signal within said second GPS receiver using said CVas and SA correction information received from said first GPS receiver to generate PPS based positioning information therefrom.

17. The method of claim 16, wherein said first GPS receiver includes a KDP (key data processor) adapted to receive a CV (crypto variable) from an external keying device, said KDP operable for generating said CVas and SA correction information.

18. The method of claim 16, wherein said second GPS receiver includes a Y code generator coupled to receive said CVas from said first GPS receiver and generating a Y code therefrom, said Y code used to process said PPS signal within said second GPS receiver.

19. The method of claim 16, wherein said second GPS receiver does not include a KDP(key data processor).

20. The method of claim 19, wherein said first GPS receiver has a higher security classification level than said second GPS receiver.

* * * * *